(12) United States Patent  (10) Patent No.: US 6,697,266 B2
Poon et al.  (45) Date of Patent: Feb. 24, 2004

(54) METHOD AND SYSTEM FOR PROVIDING A DC VOLTAGE WITH LOW RIPPLE BY OVERLAYING A PLURALITY OF AC SIGNALS

(75) Inventors: Franki Ngai Kit Poon, Hong Kong (CN); Man Hay Pong, Hong Kong (CN); Joe Chui Pong Liu, Hong Kong (CN)

(73) Assignee: University of Hong Kong (CN)

( * ) Notice: Subject to any disclaimer, the term of this patent is extended or adjusted under 35 U.S.C. 154(b) by 0 days.

(21) Appl. No.: 10/086,688

(22) Filed: Mar. 4, 2002

(65) Prior Publication Data

US 2003/0165069 A1 Sep. 4, 2003

(51) Int. Cl.$^7$ .............................................. H02M 3/335
(52) U.S. Cl. ........................................... 363/17; 363/71
(58) Field of Search ............................... 363/17, 65, 71

(56) References Cited

U.S. PATENT DOCUMENTS

| | | | | |
|---|---|---|---|---|
| 3,893,015 A | * | 7/1975 | Weil | |
| 4,814,963 A | * | 3/1989 | Petersen | 363/71 |
| 5,065,300 A | * | 11/1991 | Jacobson et al. | 363/71 |
| 5,229,928 A | * | 7/1993 | Karlsson et al. | 363/65 |
| 5,369,564 A | * | 11/1994 | Choi | 363/71 |
| 5,434,770 A | * | 7/1995 | Dreifuerst et al. | 363/65 |
| 5,451,962 A | * | 9/1995 | Steigerwald | 363/17 |
| 5,563,780 A | * | 10/1996 | Goad | 363/71 |
| 5,663,876 A | * | 9/1997 | Newton et al. | 363/126 |
| 5,668,464 A | * | 9/1997 | Krein et al. | 323/259 |
| 5,852,555 A | * | 12/1998 | Martin | 363/71 |
| 5,862,041 A | * | 1/1999 | Martin | 363/71 |
| 5,875,103 A | * | 2/1999 | Bhagwat et al. | 363/17 |
| 5,880,944 A | * | 3/1999 | Hickman | 363/65 |
| 6,222,745 B1 | * | 4/2001 | Amaro et al. | 363/65 |

* cited by examiner

Primary Examiner—Jeffrey Sterrett

(57) ABSTRACT

An AC-DC converter that includes a plurality of power conversion units that overlay their signals to generate a DC signal with low voltage level, small voltage and current ripples, but high DC current. The DC signal is further filtered by a LC low pass filter to further minimize the ripples before output to the load. In one embodiment, the plurality of power conversion units is preferably powered by a plurality of input pulse generators. In an alternative embodiment, the power conversion units is powered by a input pulse generator circuit that includes a plurality of n-channel MOSFETs arranged in a full bridge configuration whose gate voltages are controlled by a plurality of pulse generators.

26 Claims, 7 Drawing Sheets

METHOD AND SYSTEM FOR PROVIDING A DC VOLTAGE WITH LOW RIPPLE BY OVERLAYING A PLURALITY OF AC SIGNALS

FIELD OF THE INVENTION

The present invention relates generally to an AC-DC converter and, more specifically, to an AC-DC converter that produces a DC signal with small ripples.

BACKGROUND

FIG. 1A illustrates a typical AC-DC converter, which includes a power conversion unit, an inductor-capacitor low-pass filter, and an input pulse generator. The power conversion unit includes a transformer with a primary and a secondary winding and two rectifier diodes with their anodes coupled to either prongs of the secondary winding respectively. The cathodes of the diodes are, in turn, connected to each other as well as to the low-pass filter. The primary winding is connected to the input pulse generator.

In operation, the input pulse generator outputs an AC signal, illustrated in FIG. 1B, across the primary winding. The signal across the primary winding is then transferred to the secondary winding, where negative portion of the signal is rectified by the rectifying diodes to yield the signal illustrated in FIG. 1C. This signal is then filtered by the low-pass filter to output a DC output signal that includes output ripples, as depicted in FIG. 1E.

Although output ripples are only small perturbations when output DC voltage level is high, the ripples become a prominent feature when the output DC voltage level is low. Since a variety of modem semiconductor devices such as microprocessors typically operate at low DC voltage levels, the ripples may interfere with the proper operation of the devices. Typical modem semiconductor devices have a tolerable ripple limit of about 1% of the DC voltage. Voltage ripple is of increased concern for semiconductor devices that operate at lower DC voltages, for example 1 V, because the absolute tolerable ripple decreases as the operating voltage decreases.

One way to minimize output ripples is by improving filtering capabilities of the converter. This may be achieved by increasing the capacitance and/or lowering the impedance of the capacitor in the low-pass filter. Real capacitors having a low series impedance or typically expensive. However, large capacitors take up more space and low impedance capacitors are expensive. Alternatively, a larger inductor may be used to improve filtering capabilities. However, a larger inductor also takes up more space. In addition, they saturate much easier.

Another way to reduce output ripples is to increase the frequency of the input signal. However, high frequency current flowing through the inductor produces high frequency flux change in the inductor ferrite, which increases core loss and decreases efficiency of the inductor. In addition, inductors with low loss ferrite material is expensive.

Some work has been done to reduce output ripples by modifying the typical AC-DC converter circuit. For example, U.S. Pat. No. 5,668,464 to Krein et al., which is incorporated herein, claims an AC-DC converter circuit that incorporates a feedback control circuit that generates an AC ripple signal to cancel out output ripples. Drawbacks of this converter circuit are that the feedback control circuit not only adds complexity to the circuit but also takes up precious space within small semiconductor devices. In addition, the output inductor carries large AC current ripples that can degrade the inductor. Another patent, U.S. Pat. No. 5,663,876 to Newton et al., which is incorporated herein, describes a rectifier circuit with two output inductors that can produce a DC signal without any output ripples. However, this can only be achieved by using inductors with specific inductance values operating at a predetermined operating condition. In addition, current and voltage ripples across the two output inductors are large and can degrading their performance.

Therefore, there is a need for an improved AC-DC converter that produces a DC signal with low DC voltage level, small voltage and current ripples, but high DC output current without large capacitors and/or inductors, addition of complex circuits, or strict operating requirements.

SUMMARY OF THE INVENTION

It is therefore an object of the present invention to provide an AC-DC converter that produces a DC signal with low voltage level and small output ripples without large capacitors and/or inductors, addition of complex circuits, or strict operating requirements.

It is another object of the present invention to provide an AC-DC converter that produces a DC signal with low voltage level, small voltage and current ripples across the output inductor, but high DC output current without large capacitors and/or inductors, addition of complex circuits, or strict operating requirements.

Briefly, the present invention provides an AC-DC converter that includes a plurality of power conversion units that overlay their signals to generate a DC signal with low voltage level, small voltage and current ripples, but high DC current. In a preferred embodiment, the AC-DC converter comprises a plurality of power conversion units, an input pulse generator system, and a low pass filter. Each power conversion unit preferably includes a transformer with a primary and a secondary winding, a DC blocking capacitor connected to the primary winding, and a rectifier diode with its anode connected to the secondary winding. The cathodes of the rectifier diodes are connected to one another as well as to the low pass filter, thereby connecting each power conversion unit to each other as well as to the low pass filter. The low pass filter is preferably an inductor-capacitor low pass filter. The input pulse generator system preferably includes a plurality of input pulse generators, each connected to the DC blocking capacitor of a power conversion unit.

In operation, each input pulse generator preferably outputs a square wave input signal that is the same as but out of phase with signals generated by other generators, so that the signals overlap and at least one of the signals is high at any given moment. In one embodiment, the square wave signals are evenly phase-shifted with respect to one another. Each input signal is transmitted to a primary winding through a DC blocking capacitor, which filters away any DC biases in the signal, and is then transferred from the primary winding to the secondary winding. The signal at each secondary winding is then transmitted to a rectifying diode, which rectifies the negative portion of the signal. Each rectified signal is then overlaid to generate a DC signal with low DC voltage level, small voltage and current ripples, but high DC current. The DC signal is then filtered by the low pass filter to further reduce voltage and current ripples to generate the DC output signal.

In an alternative embodiment, the AC-DC converter includes the same power conversion unit and low pass filter as the converter described above but with a modified input pulse generator system. The modified input pulse generator system preferably includes a first, second, third, and fourth n-channel MOSFET arranged in a full bridge configuration, where the drains of the first and third MOSFET are connected to each other and to ground, the sources of the same MOSFETs are connected to the drains of the second and fourth MOSFET respectively, and the sources of the second and fourth MOSFETs are connected to a DC voltage source and a DC blocking capacitor. The DC blocking capacitor is also connected to a first and second power conversion unit, where the first and second primary winding of the first and second power conversion unit each connect to the DC blocking capacitor on one prong and to the sources of the first and third MOSFET respectively on the other prong. Preferably, a first, second, third, and fourth pulse generator are connected to the gate of the first, second, third, and fourth MOSFET respectively. The first and second pulse generators output square pulses to alternately switch the first and second MOSFETs on; that is, either the first or the second MOSFET is switched on, but never at the same time. A brief period during which both MOSFETs are switched off is inserted in between alternately switching of the MOSFETs to prevent connecting the DC voltage source to ground. By alternately switching the first and second MOSFET on, the first primary winding is alternately connected to the DC voltage source and ground, generating a signal across the winding.

The third and fourth pulse generators output the same signals as the first and second pulse generators respectively but phase-shifted by 180 degrees. This generates a signal across the second primary winding that is the same signal as that across the first primary winding but phase-shifted by 180 degrees. The signals across the first and second primary winding preferably stay high longer than they are low, so that the two signals overlap while they are high and at least one signal is high at any one moment. The signals at the primary windings are then transferred to the secondary windings and then to the rectifying diodes, where negative portions of the signals are rectified. The rectified signals are then overlaid to create a DC signal with low voltage level with small voltage and current ripples but high DC current. The overlaid DC signal is then filtered by the inductor-capacitor low pass filter to further minimize ripples before output to a load.

DETAILED DESCRIPTION OF THE PREFERRED EMBODIMENT

Figure 1A:
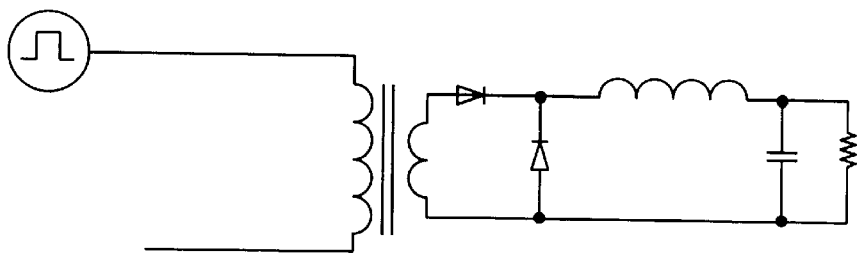
FIG. 1A is a schematic diagram of a typical prior art AC-DC converter.
Figure 1B:
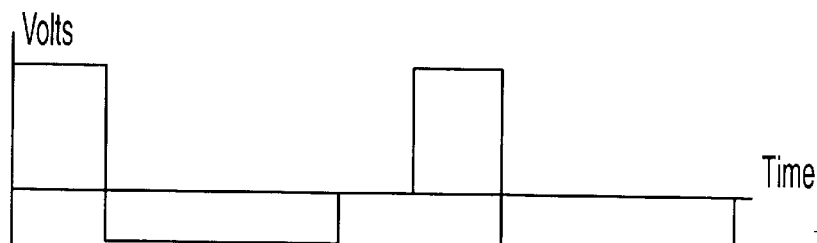
FIG. 1B is a graph of the input signal generated by the input pulse generator across the primary winding of the converter depicted in FIG. 1A.
Figure 1C:
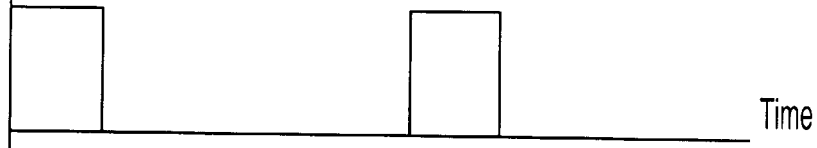
FIG. 1C is a graph of the signal depicted in FIG. 1B after it is transferred from the primary winding to the secondary winding and is rectified by rectifying diodes of the converter depicted in FIG. 1A.
Figure 1D:
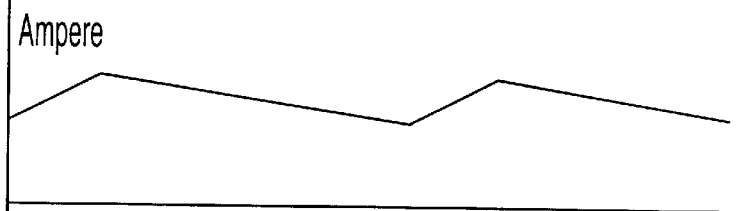
FIG. 1D is a graph of the current that flows through the inductor of the converter depicted in FIG. 1A.
Figure 1E:
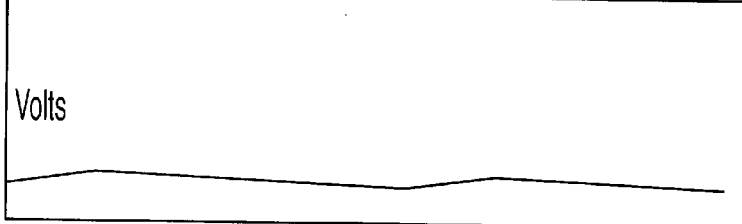
FIG. 1E is a graph of the output DC signal of the converter depicted in FIG. 1A.
Figure 2:
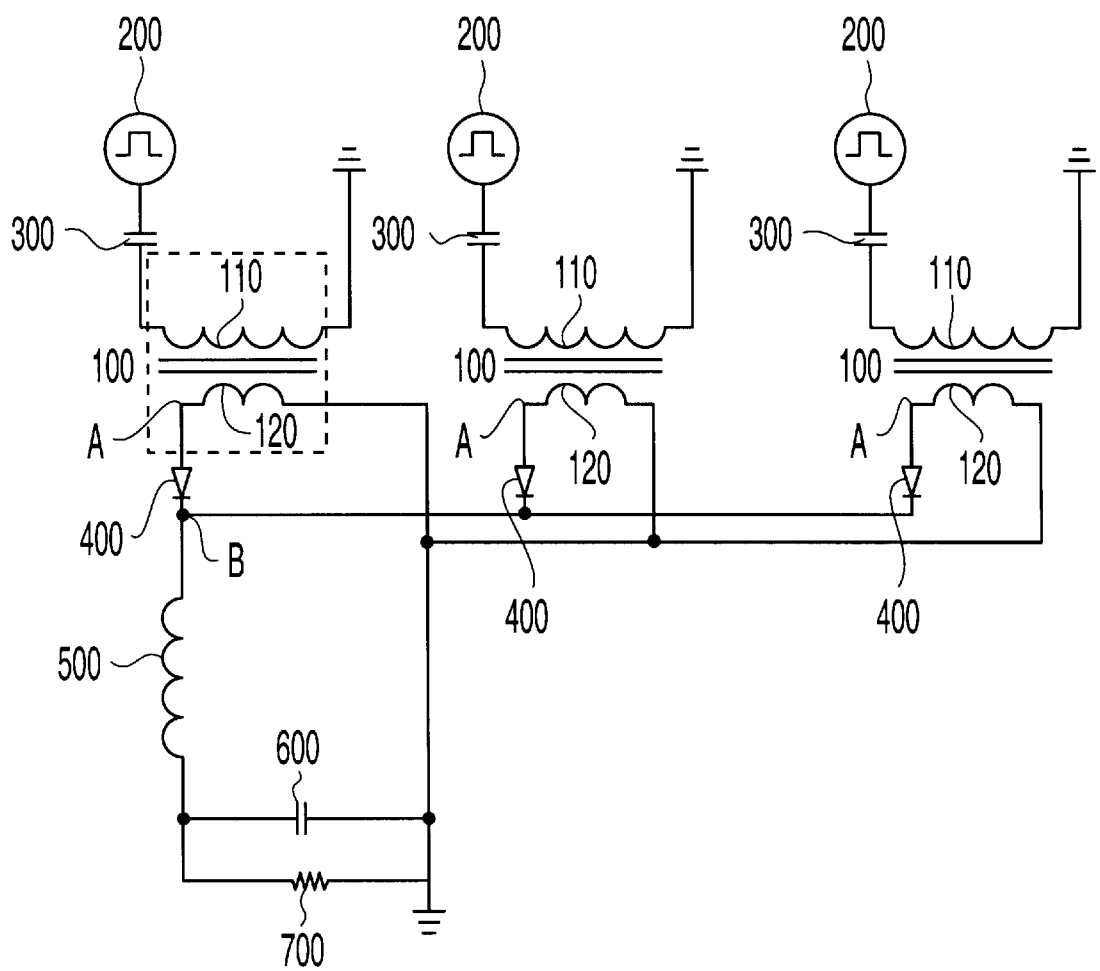
FIG. 2 is a schematic diagram of a preferred AC-DC converter according to the invention.

FIG. 2 illustrates a preferred embodiment of an AC-DC converter 10 in accordance with the present invention. As shown in FIG. 2, AC-DC converter 10 preferably includes a plurality of power conversion units that each includes a transformer 100 with primary winding 110 and secondary winding 120, a DC blocking capacitor 300 connected to primary winding 110, and a rectifier, such as a rectifier diode 400 connected to secondary winding 120. It should be understood that the transformers may be replaced with inductors for non-isolation of AC-DC converter 10.

Upon reference to the present specification, one of ordinary skill in the art would understand that although three power conversion units are depicted in FIG. 2, fewer or additional units may be added with proper modifications. Increasing the number of power conversion units preferably decreases the relative amount of ripple present in the DC output voltage. More power conversion units may be added to any embodiment of the invention to decrease voltage ripple and increase DC current output.

An input pulse generator 200 is connected to each DC blocking capacitor 300. The cathodes of diodes 400 are preferably connect at node B so that signals from each power conversion unit are channeled to and overlaid at the node. Overlaying signals from a plurality power conversion units advantageously provides a DC signal with low voltage level, small voltage and current ripples, but high DC current, as discussed below in conjunction with FIG. 3G. An inductor-capacitor (LC) low-pass filter formed by inductor 500 and capacitor 600 connects to the cathodes of rectifying diodes 400 at node B. The output prong of inductor 500 of the LC low-pass filter supplies the output DC signal to load 700.

Figure 3:
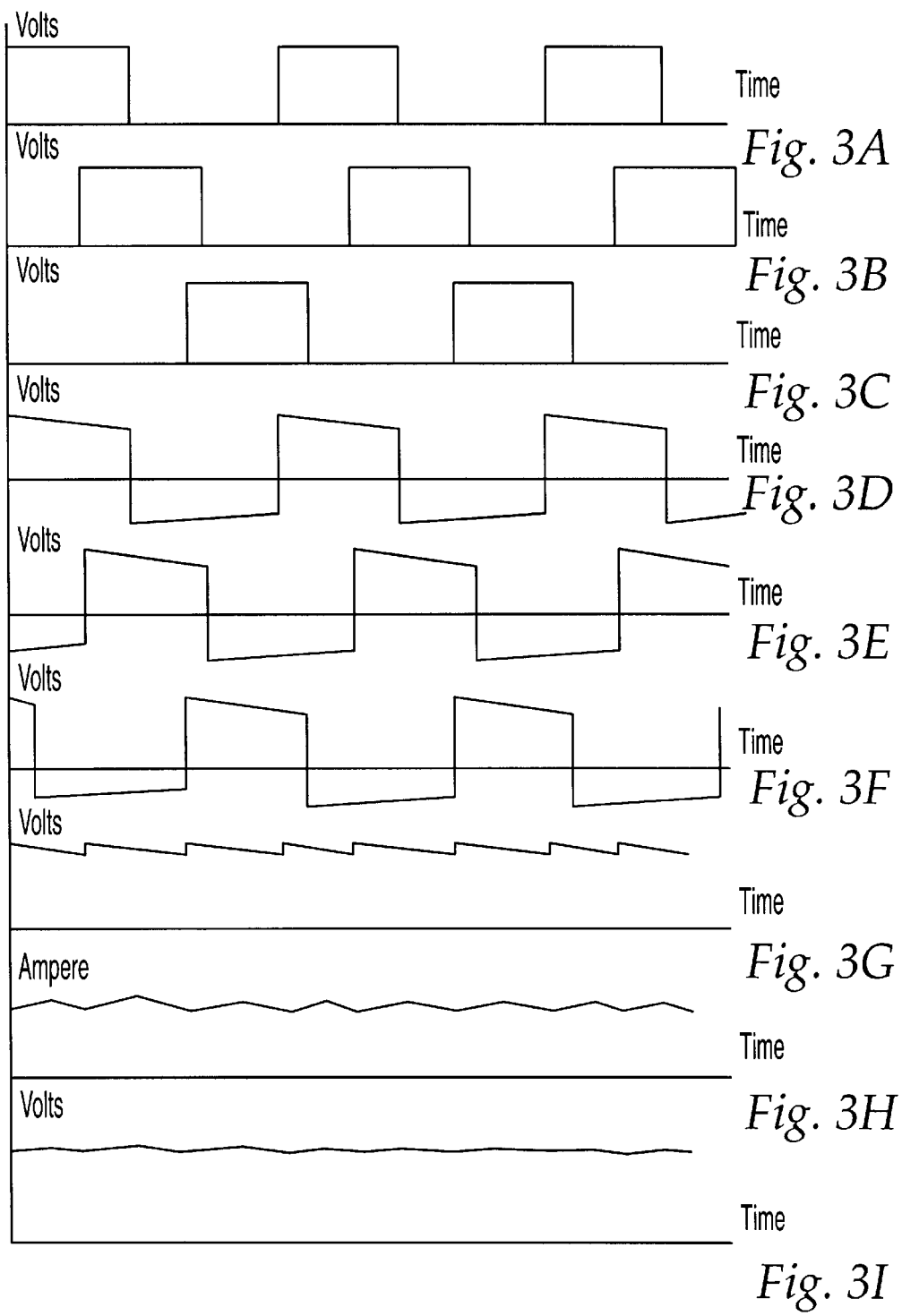
FIGS. 3A–C are graphs of signals generated by input pulse generators of the converter depicted in FIG. 2.
FIGS. 3D–F are graphs of signals across the secondary windings of the converter depicted in FIG. 2.
FIG. 3G is a graph of the signal at node B of the converter depicted in FIG. 2.
FIG. 3H is a graph of the current across the output inductor of the converter depicted in FIG. 2.
FIG. 3I is a graph of the output DC signal of the converter depicted in FIG. 2.

Various aspects of the operation of AC-DC converter 10 are depicted in FIGS. 3A–H. FIGS. 3A–C, illustrate signals generated by input pulse generators 200. Each input pulse generator 200 preferably provides a time-varying electrical signal. Thus, input pulse generators 200 generate preferably periodic waveforms such as square waves of preferably equal magnitude and pulse width that are staggered evenly in time, so that, at any one moment, at least one of the input signals is high. That is, the time-varying electrical signals provided by input pulse generators 200 are out of phase.

The waveforms output by pulse generators may have a constant or varying frequency. A non-limiting range of suitable frequencies would include for example frequencies in the range of about 25 kHz to about 1 mHz, such as from about 100 kHz to about 500 kHz. Upon reference to the present specification, one of ordinary skill in the art would understand that the values, such as the capacitance and inductance, of the components of AC-DC converter 10 depend upon the frequencies of the waveforms received from the pulse generators.

Each input signal is transmitted to a primary winding 110 through a DC blocking capacitor 300, which reduces and preferably blocks any DC bias in the signal to prevent saturation of transformers 100. Each signal is then transferred from primary winding 110 to secondary winding 120, which transfer prepares time-varying output signals.

The time-varying output signals at secondary windings 120 (node A) are illustrated in FIGS. 3D–F. These signals are shaped by impedances of capacitors 300 and primary windings 110 resulting in sawtooth-like waveforms that are slightly voltage-shifted downwards. The time-varying signals at the secondary windings 120 have a smaller absolute DC bias than the input signals accepted by AC-DC converter 10. By absolute DC bias, it is meant the absolute value of the DC bias.

The time-varying output signals at secondary windings 120 (node A) are rectified by diodes 400 so that only the positive portions of the signals remain. After rectification, signals from each power conversion unit are channeled to and overlaid together at node B to result in the signal depicted in FIG. 3G. As can be seen in the figure, before a signal from one power conversion unit can decay to any significant extent, a second signal from another power conversion unit is overlaid on top of the first signal, resulting in a DC signal with minimum voltage and current ripples. In addition, overlaying of signals allows each power conversion unit to contribute to the total current at node B, increasing current level of the signal at the node and at the converter output. The rectifiers may be reversed to obtain a negative DC output voltage.

In an alternative embodiment, rectifying diodes 400 may be replaced with electronic switches, such as, for example, MOSFET or synchronous rectifiers. A synchronous rectifier is provided by replacing a diode with a MOSFET. For example, diode 400 may be replaced by a MOSFET having a proper gate driving sequence. The gate driving voltage of the MOSFET is programmed to turn on when the circuit path, in which the MOSFET is located, is under forward current. A MOSFET may have a voltage drop of less than about 0.6 V, which voltage is typical of diodes.

Returning to FIGS. 3A–3I, the signal at node B is next filtered by a LC low-pass filter formed by inductor 500 and capacitor 600 to further reduce voltage and current ripples, yielding an output DC signal depicted in FIG. 3I. Besides serving as a filtering element for minimizing ripples, inductor 500 also acts as a defined equivalent DC current source for load 700 with current equal to the DC output current of AC-DC converter 10. With a defined current load, input pulse generators 200 would be able to generate input current waveforms in phase with input pulse signals. In addition, a defined current source load minimizes numerous undesired circuit behavior such as resonance between leakage inductance of the transformer or undefined capacitance on the load side. A defined current source load also draws smaller a RMS current from diodes 400 and input pulse generators 200, thereby reducing signal loss caused by current peak. Diodes 400 or pulse generators 200 preferably experience a square-wave like current waveform, which provides a minimum RMS value as compared to the average value of the current. The waveform shape is determined a square wave by the inductor rather than by the unpredictable load current. The average value of the current is determined by the load.

Referring to FIG. 3G, the voltage ripple at B does not go to zero as it does in prior art voltage supplies where the voltage ripple at the output inductor is a switching square wave. Because the ripple at B is small, output inductor 500 does not require a large inductance. Preferably, the inductance of inductor 500 is selected to provide a defined current source load to pulse generators 200 and diodes 400. Because output inductor 500 is much smaller than prior art filter inductor, a suitable inductor may be parasitic inductance from the circuit such as printed circuit board trace inductance.

The magnitude of the output voltage is determined by the amplitude of the input pulses, the duty cycle of the pulse width, and the turn ratio of the isolation transformers. For example, an increase in the amplitude of the input pulses would increase the amplitude of the DC output voltage, as would a decrease in the turn ratio of the isolation transformers. Here, the turn ratio is defined as Nprimary/Nsecondary, where N is the number of turns of the primary and secondary windings. As the number of secondary turns, Nsecondary, increases, the turn ratio will decrease, thereby increasing the output voltage.

An AC voltage waveform, such as a square wave, applied to a transformer preferably has a DC component of zero. For a voltage waveform having a zero DC component, the positive area under a voltage v time curve of the waveform is equal to the absolute value of the negative area under the voltage v time curve. That is, the integral of the positive area of the waveform is equal to the absolute value of the integral of the negative area. When the duty cycle of the input pulses is varied, the AC voltage produced by the transformer preferably varies in such a way as to provide a constant voltage time integral. By constant time integral, it is meant that the integral of the positive area remains equal to the absolute value of the negative area of the waveform. Additionally, it is preferred that the peak to peak voltage of the waveform also remains constant as the duty cycle varies. For example, if the absolute value of the peak negative amplitude decreases, the peak positive amplitude preferably increases to maintain a constant peak to peak voltage. This produces variation of the positive amplitude after rectification and, thus, the DC output voltage.

Figure 4:
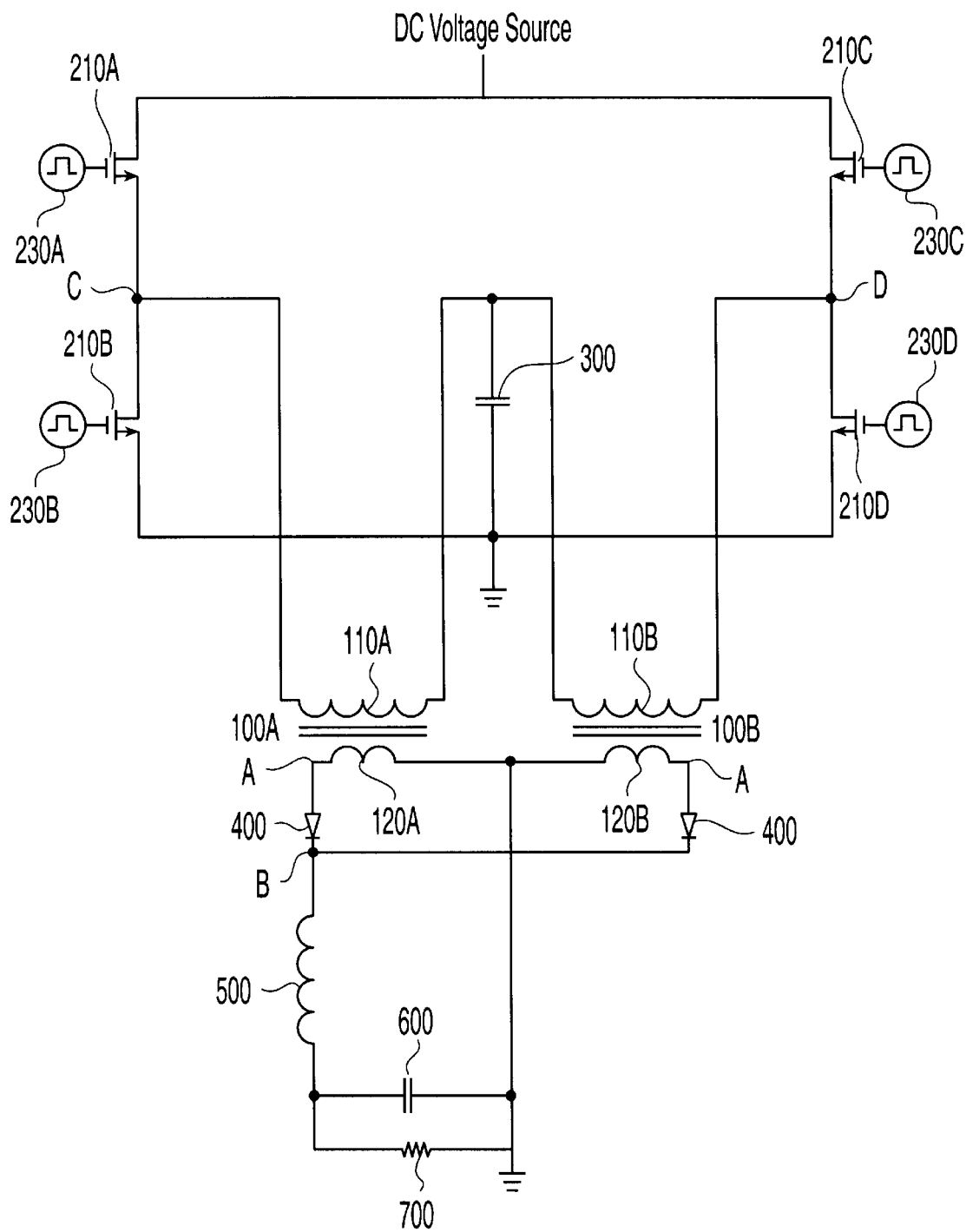
FIG. 4 is an alternative embodiment of the AC-DC converter according to the invention.

AC-DC converter 10 according to the invention can be modified into an AC-DC converter 20 illustrated in FIG. 4. The modified AC-DC converter includes an input pulse generator circuit, two power conversion units, and a capacitor-inductor low pass filter. The input pulse generator circuit preferably accepts a plurality of input signals from pulse generators 230 to thereby prepare intermediate time-varying signals applied to the power conversion units. The power conversion units output time-varying signals that are combined to prepare a direct current output signal.

The input pulse generator circuit includes a plurality of field effect transistors, such as four n-channel MOSFETs 210A–D, DC voltage source 240, and pulse generators 230 A–D. N-channel MOSFETs 210 A–D are arranged in a full bridge configuration with drains of MOSFETs 210 A and C coupled to a DC voltage source 240 and their sources coupled to the drains of MOSFETs 210 B and D, respectively. The sources of MOSFETs 210 B and D are coupled to ground and DC blocking capacitor 300. Each gate of MOSFETs 210 A–D is coupled to a pulse generator 230 A–D that are each programmed to output pulses of specific period and amplitude as described in conjunction with FIGS. 5A–D below. The MOSFETs preferably operate as switches toggling between the on and off states as described below. Thus, p-channel MOSFETs, which may also be used to perform a switching function, may be used in an AC-DC converter of the invention.

Input signal generator circuit supplies input signals to two power conversion units. Each power conversion unit includes a transformer 100 and a rectifying diode 400. The two power conversion units also share one DC blocking capacitor 300, eliminating the need for additional capacitors. Primary windings 110 A and B are coupled to nodes C and D, respectively, and to DC blocking capacitor 300. Secondary windings 120 are each coupled to diodes 400. The cathodes of diodes 400 are connected to node B so that signals from each power conversion unit are channeled to and overlaid at the node. Node B is, in turn, connected to a LC low-pass filter formed by inductor 500 and capacitor 600. The output prong of inductor 500 of the LC low-pass filter outputs the resultant DC signal to load 700. It should be understood that the transformers may be replaced with inductors for non-isolation of AC-DC converter 20.

Various aspects of the operation of AC-DC converter 20 are illustrated in FIGS. 5A–I. The first four figures, FIGS. 5A–D, depict signals generated by pulse generators 230 that are applied to gates of MOSFETs 210A–D. Signals from pulse generators 230A and 230C are identical but phase shifted by 180 degrees. Similarly, signals from pulse generators 230B and 230D are also identical but phase shifted by 180 degrees. Timing of the pulses is crucial for minimizing ripples in the DC output of AC-DC converter 10, as discussed below in conjunction with FIG. 5G.

When the signal at pulse generator 230A is high and the signal at pulse generator 230B is low, MOSFET 210A is switched on while MOSFET 210B is switched off, connecting primary windings 110A to DC voltage source 240 at node C. With capacitor 300 at a lower potential than DC voltage source 240, a potential drop is established across primary winding 110A, causing current to flow across primary winding 110 A to charge capacitor 300. As capacitor 300 charges, the potential difference across primary winding 110 A decreases.

When the signal at pulse generator 230A is low and the signal at pulse generator 230B is high, MOSFET 210A is switched off and MOSFET 210B is switched on, connecting primary winding 110 A to ground through node C. The voltage difference across primary winding 110 A is now reversed, with capacitor 300 discharging voltage and current through primary winding 110 A to ground through point C. As capacitor 300 discharges, the voltage difference across primary winding 110 A decreases.

A brief period during which signals from both pulse generators 230 A and B are low is inserted between alternately switching MOSFETs 210A and B so that the MOSFETs are never switched on simultaneously. Thus, for example, waveforms 5A–5B and 5C–5D represent first and second pairs of preferably orthogonal waveforms. This prevents connecting DC voltage source directly to ground and damaging the DC voltage source. When signals 230A and 230B are low, the waveform across the primary winding 110A will be either positive or negative depending upon the magnetizing current of the primary winding. The magnetizing current of the primary winding will flow through the body diodes of two diagonal MOSFETs. The body diodes are inherent to each MOSFET and connected in antiparallel therewith. The direction and magnitude of the magnetizing current depends upon the magnetizing inductance, operating duty cycle and the phase of the transformer. Preferably, the time period is small and will prevent the preparation of a low output ripple voltage.

Figures 5A, 5B, 5C, 5D, 5E, 5F, 5G, 5H, 5I:
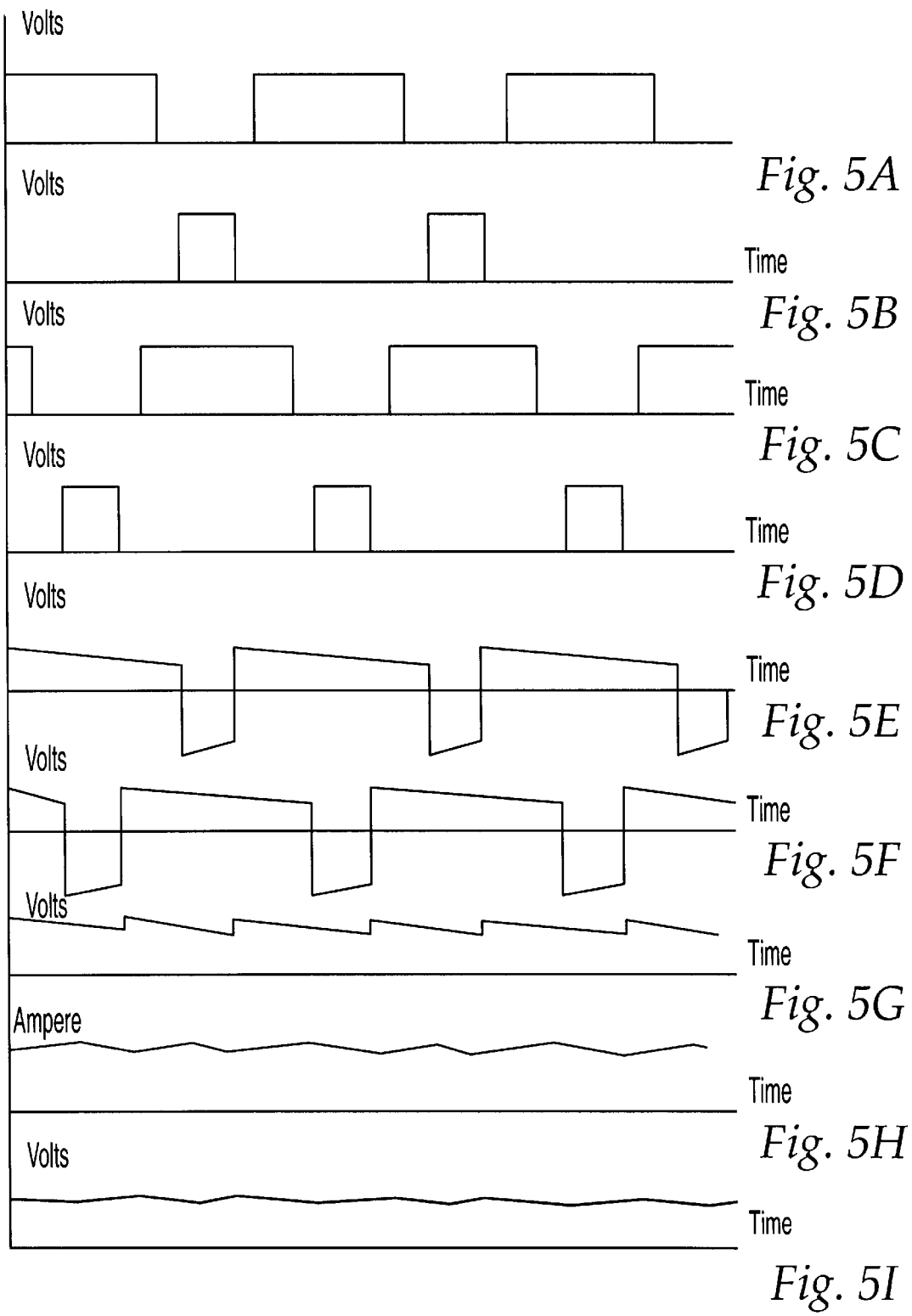
FIGS. 5A–D are graphs of signals generated by pulse generators of the converter depicted in FIG. 4.
FIGS. 5E–F are graphs of signals across the secondary windings of the converter depicted in FIG. 4.
FIG. 5G is a graph of the signal at node B of the converter depicted in FIG. 4.
FIG. 5H is a graph of the current across the output inductor of the converter depicted in FIG. 4.
FIG. 5I is a graph of the output DC signal of the converter depicted in FIG. 4.

The interoperation of pulse generators 230 A and B with MOSFETs 210 A and B creates a saw-tooth like waveform shifted downwards across primary winding 110 A as illustrated in FIG. 5E. The general shape of the waveforms is caused by the charging and discharging of capacitor 300 as well as the impedances of MOSFETs 210 A and B and primary winding 110A. Input pulse generators 230 C and D and MOSFETs 210 C and D interoperate in the same manner as input pulse generators 230 A and B and MOSFETs 210 A and B but phase shifted by 180 degrees to generate the waveform illustrated in FIG. 5F across primary winding 110 B.

The sharing of the DC blocking capacitor 300 is an advantage of AC-DC converter 50. For example, in the event that the DC blocking capacitor is being charged through winding 110 A and being discharged by winding 110B, the RMS current flowing through the blocking capacitor is preferably reduced. Thus, as compared to other voltage sources, a smaller or lower quality capacitor may be used.

Signals are passed from primary windings 110 to secondary windings 120 where they are rectified by diodes 400 so that only the positive portions of the signals remain. Signals from each power conversion units are then overlaid at node B resulting in the signal depicted in FIG. 5G. Specifically, before a first signal from one power conversion unit can decay to any significant extent, a second signal from a second power conversion unit is overlaid on top of the first signal, resulting in a DC signal with minimum voltage and current ripples at node B as well as at the converter output. Overlaying of signals from a plurality of power conversion units also allows each power conversion unit to contribute current at node B, increasing current level of the signal at the node and, thus, at the converter output. The signal at node B is further filtered by a LC low-pass filter formed by inductor 500 and capacitor 600 to further reduce voltage ripples, yielding a DC signal depicted in FIG. 5I. The rectifiers may be reversed to obtain a negative DC output voltage.

The amplitude of the DC output voltage is determined by the duty cycle of the pulses generated by pulse generator 230. Increasing the on duty cycle increases the average DC voltage of the pulse generators and, hence, increase the voltage across the DC blocking capacitor. With a higher voltage across the DC blocking capacitor 300, the potential difference across primary windings 110A and B is smaller when primary windings 110 A and B are connected to DC voltage source 240, decreasing the amplitude of the signal at node B and, thus at the output.

AC DC converter 10 or 20 may be modified to eliminate sharp voltage edges and undesired voltage spikes caused by parasitic or leakage impedance in transformers 100 or other circuit elements. For example, snubber circuits may be added across rectifying diodes 400, secondary winding 120, or across low pass filter 500 and 600.

Figure 6:
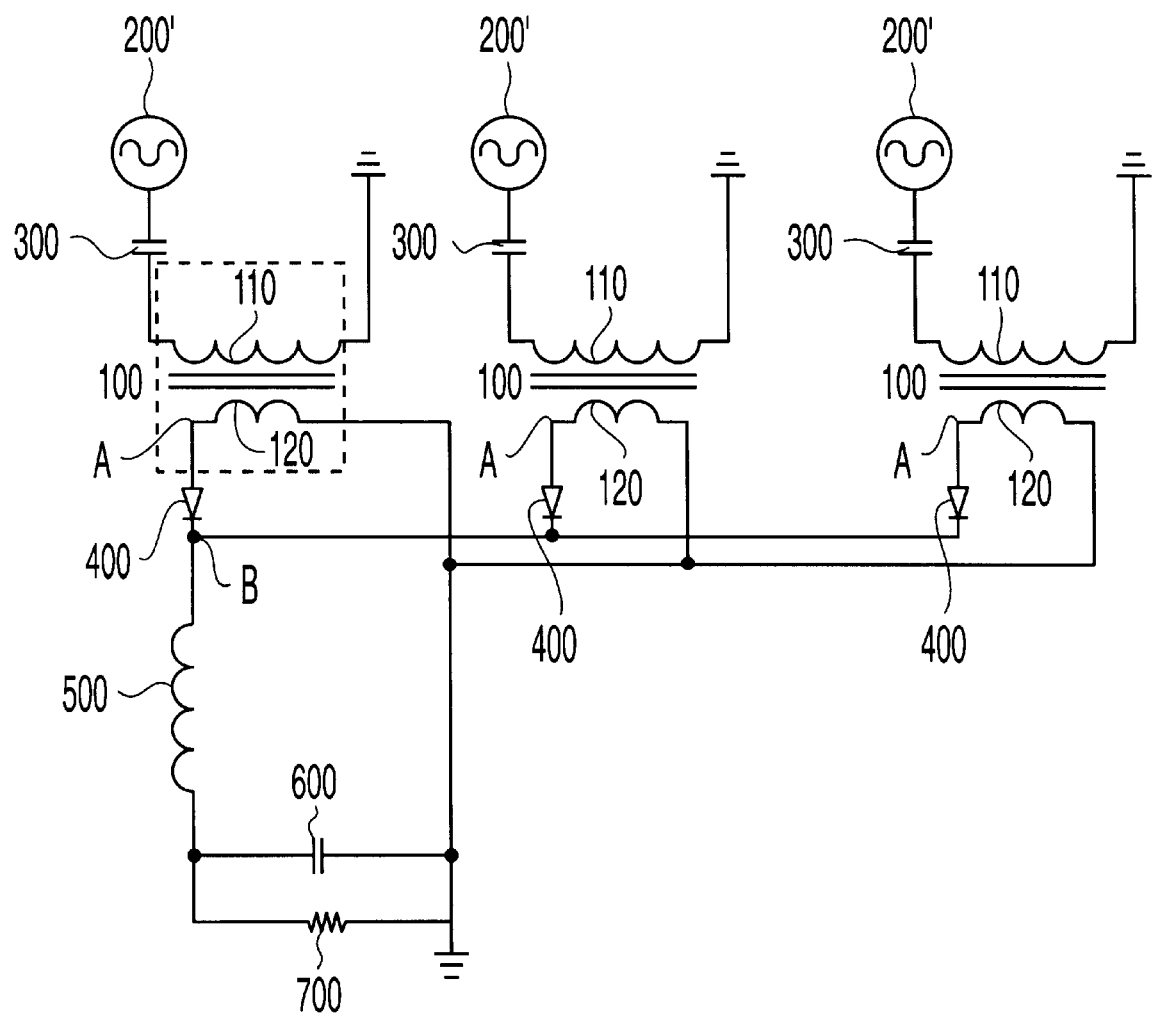
FIG. 6 shows an embodiment of the present invention using sinusoidal input signals.
Figure 7:
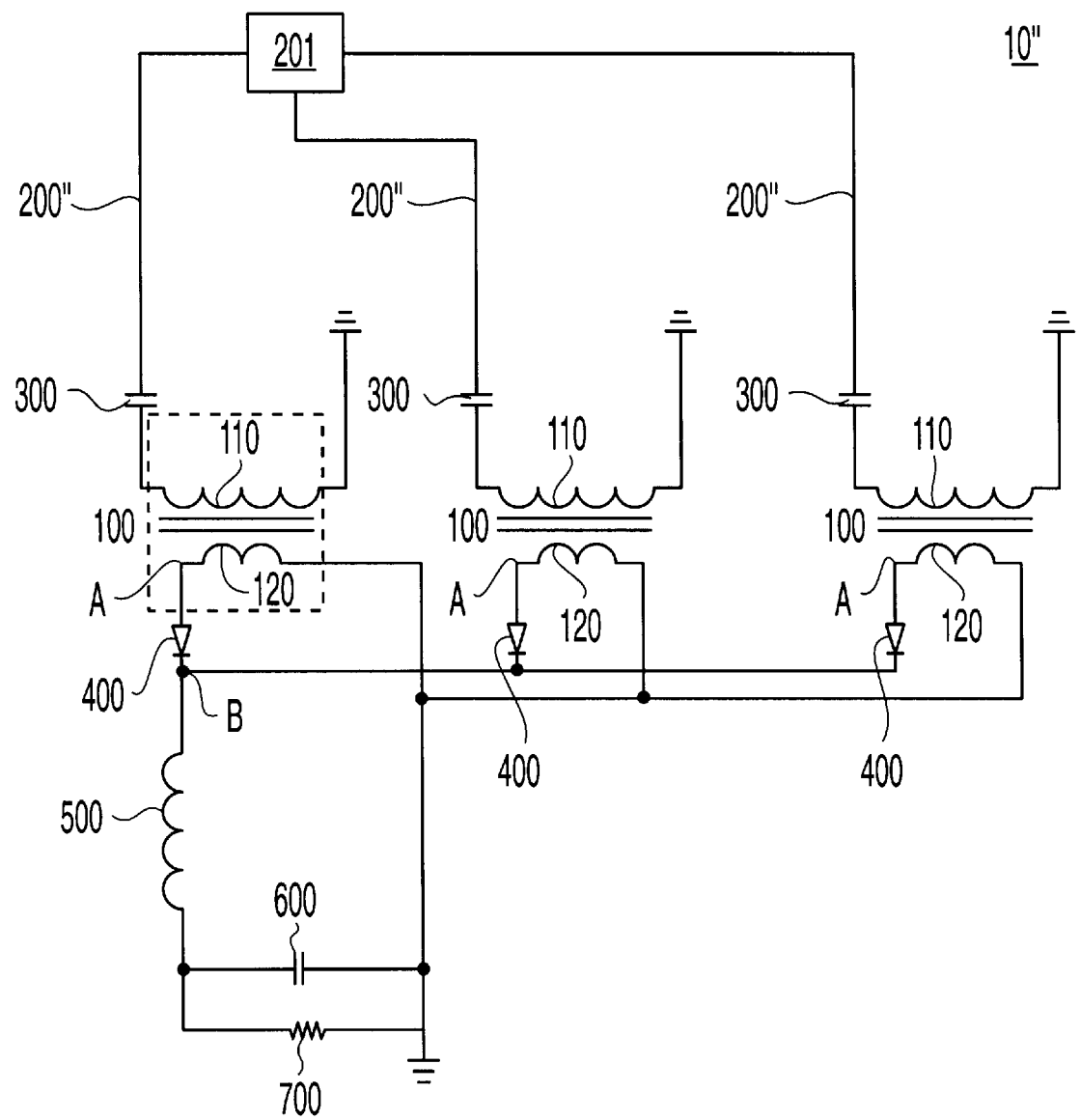
FIG. 7 shows an embodiment of the present invention using a single source of time varying input signals.

Referring to FIG. 6, an embodiment of the present invention using sinusoidal input signals 200' is shown. Referring to FIG. 7, an embodiment of the present invention using a single source 201 to provide a plurality of time varying input signals 200" is shown.

The present invention is not to be limited in scope by the specific embodiments described herein, which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the appended claims.

All publications and patent applications mentioned in this specification are herein incorporated by reference to the same extent as if each individual publication or patent application was specifically and individually indicated to be incorporated by reference.

What is claimed is:

1. A device for preparing a direct current (DC) signal from a plurality of input signals, comprising:
   a plurality of transformers, each transformer having first and second input connections and first and second output connections;
   a respective source of time varying input signals connected to the first input connection of each transformer, wherein (a) each time varying input signal alternates between a positive and negative voltage and (b) time varying input signals connected to different first input connections have different phases;
   an overlaying circuit for combining signals output by the transformers, the output signal of each transformer comprising an asymmetric time-varying signal having a respective different phase, to thereby prepare the DC signal, the overlaying circuit comprising:
   a first node to which the first output connection of each transformer is connected, wherein an electrical path between the first output connection of each transformer and the first node includes a rectifier;
   a second node to which the second output connection of each transformer is connected; and
   first and second output terminals respectively connected to the first and second nodes.

2. The device of claim 1, comprising a capacitor in series with the first input connection of each transformer.

3. The device of claim 1, wherein each rectifier comprises at least one diode.

4. The device of claim 3, wherein the overlaying circuit combines the signals output by the transformers after rectification.

5. The device of claim 3, wherein at least one diode is in series with one of the output connections of each transformer.

6. The device of claim 1, wherein the time varying input signals at least partially overlap with one another.

7. The device of claim 6, wherein each time varying input signal comprises at least one of a square wave and a sinusoid.

8. The device of claim 6, further comprising at least one power source to provide the plurality of time varying input signals.

9. The device of claim 6, wherein an absolute DC bias of the signals output by the transformers is less than an absolute DC bias of the time-varying input signals.

10. A device for preparing a direct current (DC) signal from a plurality of input signals, comprising:
    an input circuit for preparing a plurality of intermediate time-varying signals from the plurality of input signals, the input circuit comprising:
    a DC voltage source;
    first and second sets of transistors, each member of the first and second sets of
    transistors comprising a respective gate, a respective first connection, and a
    respective second connection, wherein the gate of each transistor is connected
    to a respective different input signal;
    a plurality of power converters, each power converter configured to prepare an asymmetric time-varying output signal from a respective intermediate time-varying signal, each intermediate time-varying signal alternating between a positive and a negative voltage and each asymmetric time-varying output signal having a respective, different phase, wherein each power converter comprises a first and a second input connection, wherein (a) the respective first connection of each member of the first set of transistors is connected to the DC voltage source and the second connection of each member of the first set of transistors is in electrical communication with a respective first input of a power converter and (b) the respective first connection of each member of the second set of transistors is in electrical communication with (i) a respective first input of a power converter and (ii) a respective second connection of a member of the first set of transistors, and wherein the input signal connected to the gate of each member of the second set of transistors that is connected to a member of the first set of transistors has a duty cycle different from that of the input signal connected to the gate of the connected member of the first set of transistors; and
    an overlaying circuit for combining the asymmetric time-varying output signals to thereby prepare the DC signal.

11. The device according to claim 10, wherein the input signals comprise first and second pairs of orthogonal time varying electrical signals.

12. The device of claim 10, wherein the transistors are metal-oxide semiconductor field effect transistors (MOSFETs).

13. The device of claim 12, wherein the first connection of each member of the first set of transistors is a drain biased at a DC.

14. The device of claim 13, wherein the first connection of each member of the second set of transistors is a drain in electrical communication with a respective member of the first set of transistors.

15. The device of claim 14, wherein the input signals accepted by the first and second sets of transistors having a different duty cycle.

16. The device of claim 15, wherein the input signals accepted by the first and second sets of transistors have a different phase.

17. The device in accordance with claim 10, wherein said input circuit comprises a plurality of MOSFETs connected in a full-bridge configuration.

18. The device in accordance with claim 17, wherein said input circuit further comprises a DC voltage source connected to a drain of each member of a subset of the MOSFETs.

19. The device accordance with claim 18, wherein a respective input signal from a power source controls a gate voltage of each of said plurality of MOSFETs to thereby prepare the intermediate time-varying signals.

20. The device according to claim 19, wherein each input signal is a time-varying input signal.

21. The device in accordance with claim 20, wherein said input signals switch MOSFETs on and off by controlling gate voltages of said MOSFETs so as to alternatively connect said power converters to a DC voltage source or ground.

22. The device in accordance with claim 21, wherein each power converter comprises a transformer with a primary and a secondary winding.

23. The device according to claim 22, wherein each said power converter further comprises a rectifying diode whose anode connects to said secondary winding and whose cathode connects to cathode of at least one other rectifying diode of another said power converter.

24. A method for preparing a direct current (DC) signal from a plurality of input signals, comprising:

providing a circuit comprising first and second transformers, each transformer having first and second input connections and first and second output connections;

inputting a time-varying input signal to the first input connection of each transformer, the time-varying input signals each (i) having a respective, different phase and (ii) alternating between a positive and a negative voltage, each transformer outputting a respective asymmetric time-varying output signal, each asymmetric time-varying output signal having a respective different phase;

combining the asymmetric time-varying output signals to thereby prepare the DC signal, the step of combining comprising inputting signals output from the first output connection of each transformer to a first node, wherein the step of inputting comprises rectifying the signal output from each first output connection; and outputting the DC signal, the DC signal being output across a first output connection in electrical communication with the first node and a second output connection in electrical communication with a second node to which second node the second output connection of each transformer is connected.

25. The method of claim 24, wherein the time-varying output signals are rectified prior to combining.

26. The method of claim 24, wherein the step of preparing the time-varying output signals further comprises reducing a DC bias of the input signals.

* * * * *